A. C. CUNNINGHAM.
FLOATING DRY DOCK.
APPLICATION FILED DEC. 24, 1910.
1,022,931.
Patented Apr. 9, 1912.
2 SHEETS—SHEET 2.
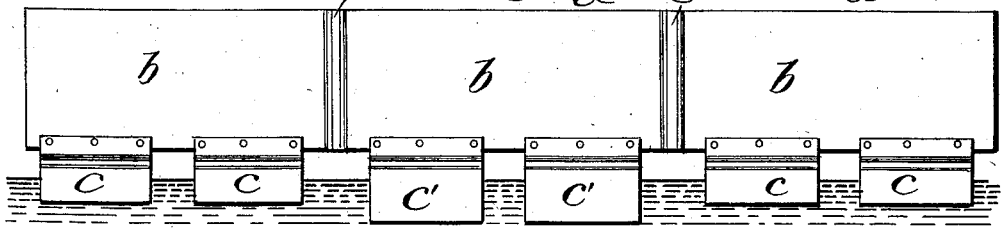
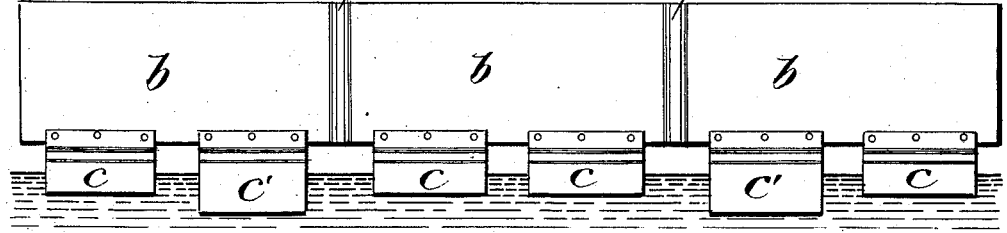
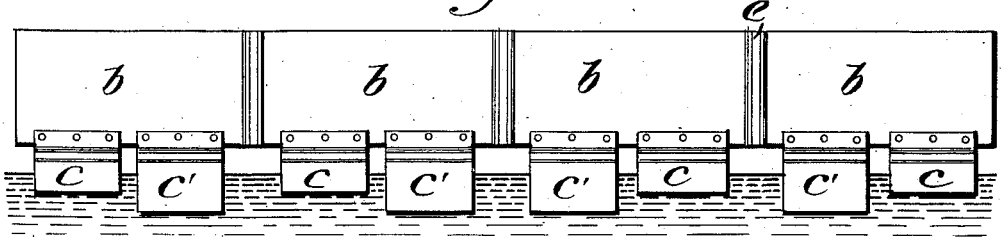
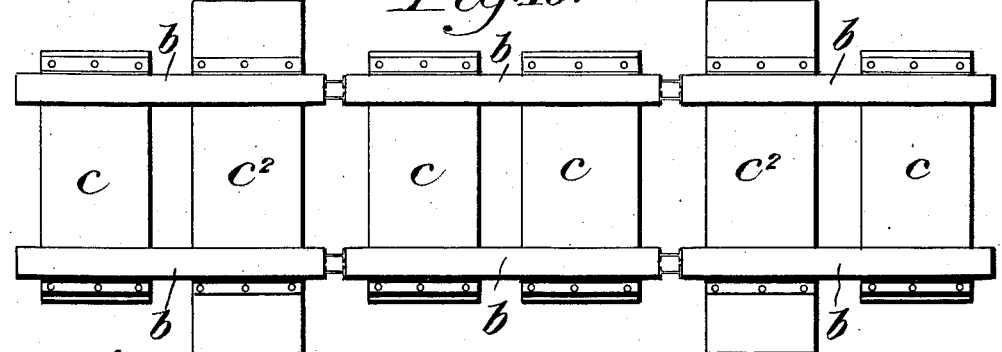

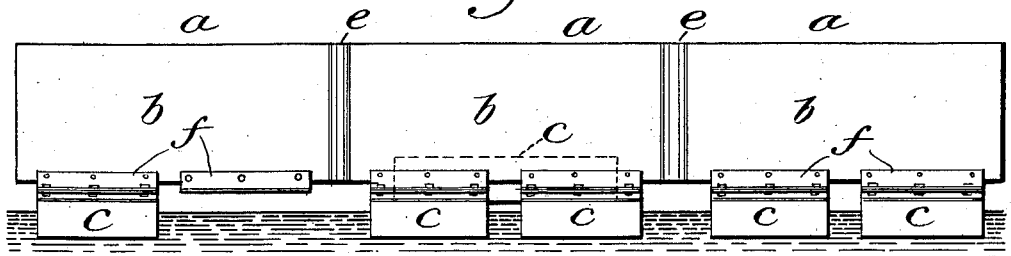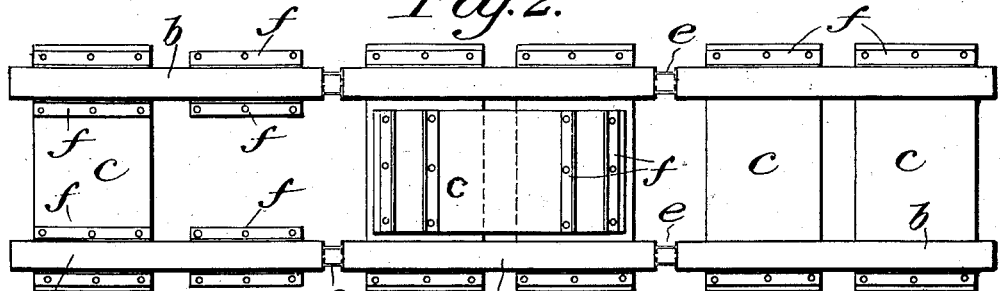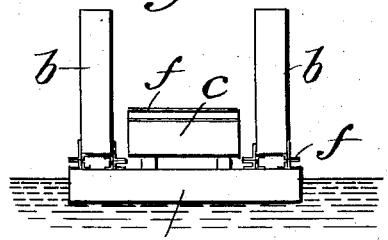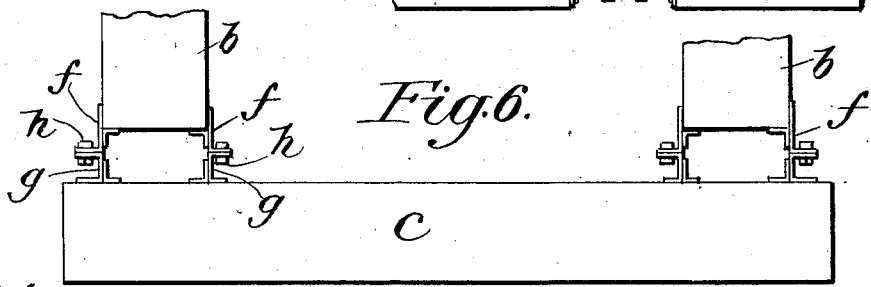

UNITED STATES PATENT OFFICE.

ANDREW C. CUNNINGHAM, OF WASHINGTON, DISTRICT OF COLUMBIA.

FLOATING DRY-DOCK.

1,022,931.                Specification of Letters Patent.          Patented Apr. 9, 1912.

Application filed December 24, 1910. Serial No. 599,075.

*To all whom it may concern:*

Be it known that I, ANDREW C. CUNNINGHAM, a citizen of the United States, and resident of Washington, District of Columbia, have invented certain new and useful Improvements in Floating Dry-Docks; and I do hereby declare the following to be a full, clear, and exact description of the invention, such as will enable others skilled in the art to which it appertains to make and use the same.

This invention has reference to floating dry docks and more particularly to sectional floating docks of the type shown in my Patent No. 710,765, dated October 7, 1902.

The object of the invention is to improve in a number of respects the construction set forth in the above mentioned patent, especially with a view of obtaining greater ease and facility in the assemblage, adjustment and rearrangement of the several parts of the dock structure.

The invention provides a structure in which the bottoms of the individual detachable dock sections are made in parts directed transversely of the dock sections and preferably comprising comparatively small pontoons having provision at their ends for attachment to the lower edges of the upright side walls of the dock sections. These pontoons may be made of different sizes, preferably as regards the length or depth of the same, in order that they can be so arranged on the associated sections of a dock as to float a docked vessel or the like in a uniform manner, regardless of the distribution of weight in such vessel in a fore and aft direction. By making the pontoons or bottom units of the dock sections of uniform width the interchangeability of such pontoons with respect to the several dock sections is provided for, and by constructing the dock as a whole in the manner indicated, provision is made for the easy self-docking of the individual pontoons in the manner to be presently described.

In the accompanying drawings:—Figure 1 is a side elevation of a floating dry dock constructed in accordance with the invention, one of the pontoons being self-docked as indicated in dotted lines, Fig. 2 is a top plan view of Fig. 1, Fig. 3 is an end elevation of Fig. 2, Figs. 4 and 5 are enlarged detail views of different forms of connection which may be adopted to secure together the meeting ends of the dock sections or units. Fig. 6 is a partial end view, on an enlarged scale, of one of the dock sections, and Figs. 7 to 10 show different arrangements of the dock structure as called for by the distribution of weight in the vessel or other structure to be docked.

Referring to the drawings, particularly to Figs. 1 to 3, $a$ denotes a plurality of individual dock sections or units, each of which is of the usual channel like form and open at the ends, which are adapted to be detachably secured to the ends of the adjacent sections as indicated in my prior patent. According to the present invention, however, the dock sections are not formed of integral units but each is constituted by upright side walls $b$ supported by a plurality of transverse underlying elements such as the pontoons $c$. The several sections $a$, which obviously vary in number as called for by circumstances, are preferably connected end to end by means of the connecting devices $e$ extending along and attached to the upright end edges of the side walls $b$ in such a manner that the adjacent dock sections are readily detachable from each other and may, as in my prior patent, be secured together, if desired, while at different elevations with respect to the water level.

Fig. 4 shows in detail one form of connecting devices $e$, which, as indicated, comprise flanges $e^x$ on the meeting ends of the side walls, which flanges are detachably united by a butt joint formed at $e^y$. A modified form of connection is shown at $e'$ in Fig. 5, but it will be readily understood that the particular connecting means employed forms no part of the invention, and it is for this reason that I have not described this feature in detail.

The pontoons $c$, as previously intimated, are directed transversely of the dock sections, and extend at their ends beneath the side walls $b$ in order to support the same. The ends of the pontoons are detachably secured to the lower ends of the side walls by means of mating flanges $f$, $g$, bolted or otherwise secured to the side walls and the pontoons respectively and secured together by means such as the bolts $h$, as shown in Fig. 6. In this way, the pontoons may be detached from the dock units simply by removing the bolts $h$, as will be understood.

It is preferable to have the pontoons $c$ of a predetermined width with respect to the dock sections, in order that said pontoons may be interchangeable as between the several sections. Of course it will be understood that the number of pontoons used in connection with a given dock section is a matter of choice, and that, of course, the dock sections themselves may be of different lengths. In this latter case, however, the interchangeability of the pontoons or bottom units is retained by having the width of the pontoons bear a certain ratio to the length of the dock sections, as will be understood.

It is manifestly desirable to furnish pontoons of different volume in connection with a given dock so that uniformly small or uniformly large pontoons may be employed as called for by conditions, and so that if the weight of the vessel or other structure to be docked is unequally distributed in a fore and aft direction this can be compensated for by the assemblage in the dock structure in an appropriate manner of pontoons of different sizes.

As it is preferable to have the pontoons of uniform width, for the reason previously explained, this variation in size is reached either by lengthening some pontoons as compared to others or varying the depth of the pontoons, and of course it is also possible to vary both the length and depth of these elements.

In Fig. 7 I have shown a dock of three sections in which the intermediate section is buoyed up by pontoons $c'$ of greater depth than the pontoons $c$ used in connection with the end sections; and obviously this arrangement is adapted to float uniformly a vessel in which the greater part of the weight is distributed at or near the center in a fore and aft direction. In the arrangement shown in Fig. 8, on the other hand, the relatively deep pontoons $c'$ are used at the inner parts of the end sections, to compensate for a concentration of the weight of the docked vessel at the bow and stern thereof. In some cases, it may be expedient to use a shallow and a deep pontoon with each section, as shown in Fig. 9, wherein the dock is shown as consisting of four sections. In the arrangement shown in Fig. 10, an increased buoying capacity is given to certain of the pontoons $c^2$ by extending their ends laterally beyond those of the ordinary sized pontoons $c$. Obviously this last named arrangement corresponds to the deepening of the pontoons $c'$, as shown in Fig. 8, and of course by increasing the depth of the pontoons $c^2$ as compared to that of the pontoons $c$ a still greater buoying capacity of said pontoons $c^2$ may be obtained.

It is to be understood that by employing the system described many other arrangements beside those indicated in the drawings may be adopted as called for by conditions. Obviously the invention is not concerned with the pipes, valves or pumping machinery of the dock, and I have not therefore, deemed it necessary to show any of the internal arrangements or operative parts. It is to be understood, however, that each section of the dock as already described is complete in itself and preferably has its own pumping machinery, piping, valves, and operating parts.

Such being the construction of my improved dock, it will be manifest that as the sections $a$ are all of the same cross section and provided at the ends with similar fastening devices, such sections may be connected together end to end in any number and arrangement, and that the pontoons $c$ may be used in connection with any of the sections inasmuch as said pontoons are of uniform width and provided with similar fastening devices coöperating with the similar fastening devices at the lower edges of the side walls $b$ of the sections.

With such a construction the method of operation for the rearrangement of the pontoons, after they have been once assembled, is substantially as follows: The dock is sunk by uniform flooding of the pontoons until the latter are submerged nearly to the top. The connections between the side walls of the sections and those pontoons which it is desired to rearrange, are removed and the dock is then raised by pumping, with the disconnected pontoons floating free. The pontoons are then removed in an endwise direction from under the dock and arranged as desired. The dock is then lowered by flooding and the detached pontoons are secured to the side walls of the respective sections in the desired positions, after which the dock is again ready for operation.

In order to effect the self-docking of any of the individual pontoons or bottom elements, the procedure is as follows: The pontoon to be self-docked is removed from its section in a sidewise direction, viz., laterally and away from the dock, just as in the previously described rearrangement of the pontoons. The dock is then sunk sufficiently to permit the detached pontoon to be floated into the same i. e., over the submerged pontoons between the walls of the dock, until said pontoon is brought lengthwise and centrally of one of the dock sections, after which the dock is raised by pumping, which will result in the detached pontoon being raised out of water by the underlying pontoons of the corresponding dock section, as indicated in Figs. 2 and 3. It is obvious that the pontoon can be replaced in its initial position by simply reversing the above described operations.

In carrying out the self-docking operation, I sometimes prefer to replace the pontoon being docked by a new or temporary pontoon, which is substituted for the first named pontoon after the latter has been removed laterally from its position in the dock structure. The flanges $f$, $g$ of the side walls and pontoons respectively may evidently remain in place without disturbance during the rearrangement and docking of the individual pontoons. It will be understood that although the inner fastening flanges $f$ are indicated at the left only of Fig. 2, they are in practice used in connection with each pontoon. In this connection, however, I do not wish to indicate that my invention is limited to the use of fastening devices similar to the flanges $f$, $g$, and the bolts $h$, as various changes in this particular as well as in the other features of the invention may be adopted without digressing from my inventive idea, the scope of which is defined in the claims.

What I claim is:—

1. In a floating dry dock, a plurality of sections comprising pairs of parallel upright side walls connected end to end in detachable relation with each other, and a plurality of transverse pontoons underlying and supporting each pair of side walls, said pontoons being interchangeable with respect to the several pairs of side walls.

2. In a floating dock structure, dock sections each comprising bottom units or pontoons interchangeable as between each other and said sections, certain of said pontoons differing from others in displacement, whereby the dock structure may be accommodated to a localization or concentration of weight in the vessel to be docked, as described.

3. In a floating dock structure, interchangeable dock sections detachably connected end to end, each of said sections comprising side walls and transverse underlying pontoons detachably secured to said walls, all of said pontoons being of the same width and interchangeable as between each other and the different sections, but certain of said pontoons varying from others in displacement, whereby the pontoons may be arranged to accommodate the dock structure to a localization or concentration of weight in the vessel to be docked.

4. In a floating dry dock structure, the combination of parallel upright side walls, a pontoon directed transversely of said side walls and extending at its ends beneath the same, flanges on the upper surface of the pontoon, similar flanges attached to the lower edges of the side walls and mating with those of the pontoon, and bolts detachably securing said flanges together.

5. A floating dry dock, comprising a plurality of independent sections, each section having continuous side walls and a plurality of transverse pontoons, all of said pontoons being of the same width so as to be interchangeable in position, but some having greater depth than others for securing greater displacement, and the fastening devices on each pontoon for securing it to the bottom of said side walls being like those on all other pontoons in construction and position whereby they may be connected in any position to any of said side walls.

6. A floating dry dock, comprising a plurality of independent sections, each section having continuous side walls and a plurality of transverse pontoons, all of said pontoons being of the same width so as to be interchangeable in position, but some having greater length than others for receiving greater displacement, and the fastening devices on each pontoon for securing it to the bottom of said side walls being like those on all other pontoons in construction and position whereby they may be connected in any position to any of said side walls.

In testimony whereof I affix my signature, in presence of two witnesses.

ANDREW C. CUNNINGHAM.

Witnesses:
ARTHUR L. BRYANT,
CHAS. J. O'NEILL.

Copies of this patent may be obtained for five cents each, by addressing the "Commissioner of Patents, Washington, D. C."